Patented June 11, 1929.  1,717,224

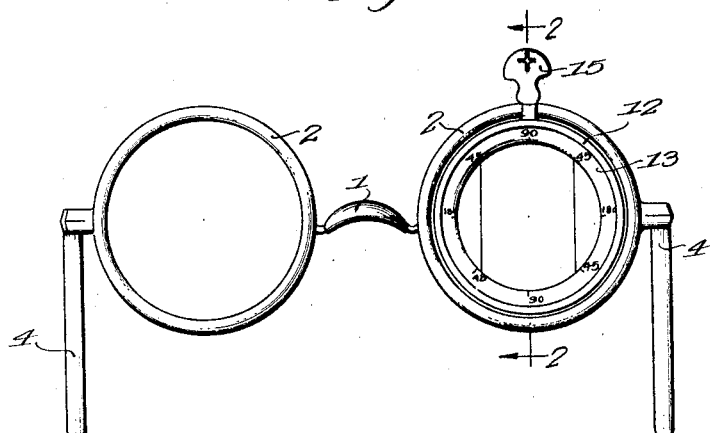

UNITED STATES PATENT OFFICE.

JOHN L. KING, OF SALEM, OHIO.

LENS-FITTING ATTACHMENT.

Application filed April 29, 1927. Serial No. 187,538.

This invention relates to lens fitting attachments designed to be used in cooperation with spectacle frames having rims without lenses and has for its object to provide means for not only testing the eyes but for making said test with the patient wearing the particular frame in which the lenses prescribed by the test are to be mounted. At the start, therefore, the test will be made with the pre-selected frame properly adjusted as to head and nose conformation and as to pupillary distance.

In the practice of optometry it has been customary to use what are known as trial frames equipped with special lens fitting devices. These trial frames are not made to conform to the individual whose eyes are to be tested. They do not conform correctly to the head, the rims may or may not be positioned at the proper pupillary distance or at the proper angle of conformation to the individual case.

The attachment provided by the present invention overcomes these disadvantages and makes it possible to coordinate in the eye test, those conditions and elements whose coordination gives the best lens prescription for the particular fitted mount.

The attachment is described in detail in the accompanying drawings and in the following detailed specification of which they form part and in which they will be referred to by numerals.

In these drawings:

Figure 1 is a front elevation of a pair of spectacles having rims without lenses in one of which is fitted the attachment of the present invention, it being understood that in practice this frame will, first, have been fitted to the head, temples and eyes of the person to be tested.

Figure 2 is a vertical section on an enlarged scale, taken on the line 2—2 of Figure 1.

Figure 3 is a top plan view on a reduced scale of the casing shown in Figure 2, the testing lens and frame rim being removed.

Figure 4 shows a vertical section taken on the line 4—4 of Figure 3, and

Figure 5 is another vertical section on line 5—5 of Figure 3.

In the drawings, a conventional form of spectacle frame is shown, the usual nosepiece or bridge 1, rims 2, with lens groove 3 (Figure 2) and temples 4, being illustrated. The attachment forming the subject matter of this invention is intended for use in connection with the lensless rims 2, of such a frame.

It consists of a metal casing, generically designated at 5, Figure 2, which provides an annular front rim 6, rearwardly of which the casing is open at its top and formed with a plurality of parallel arcuate lens-receiving grooves 7, best seen in Figures 2 and 3, in which are intended to seat test lenses. Accordingly suitable means other than the grooves themselves are provided for releasably retaining the test lenses in the grooves. Conveniently the metal at the upper end of each groove may be extended and cut away to form spring arms 8 with grooved gripping members 9 at their upper ends.

In order that the casing 5 may be attached to and supported by the lens-less rim of a frame, the rear end of the casing terminates in an arcuate wall 10 in parallel with the lens-receiving grooves 7 and shaped to seat in the lens groove of such a rim, thereby positioning the casing with the lens grooves thereof supported in proper optical relation to the frame and rim. To adapt the casing to differently sized rims, a wire spring 11 is provided which is secured to and may form a reinforcement of the wall 10 and extends therebeyond as a curved flexible locking member forming a continuation of said arcuate wall.

The testing lenses which are to be seated within the arcuate grooves 7 are usually rimmed in metal as shown at 14, Figure 2, and provided with projecting tabs such as 15 forming handles and bearing data identifying each lens as by sphere and axis. To facilitate the use of these lens with the device of my invention, I have provided an annular rotatable axis marker whose rim 12 seats over the front rim 6 of the casing 5 and holds thereagainst a ring 13 of cardboard or celluloid bearing the necessary axis data.

It will be understood that two of these attachments may be used on a frame at the same time and that the blinder or black lenses and other accessories of the usual testing frames are adaptable to the present invention. The operation of this device has been discussed heretofore in sufficient detail to make a résumé unnecessary.

What I claim, therefore, and desire to secure by Letters Patent is:—

1. A lens fitting attachment for fitted lensless frames comprising a casing providing a front rim, a plurality of parallel arcuate open lens-receiving grooves spaced rearwardly of said rim having grooved resilient lens-gripping and retaining portions, an arcuate supporting member at its rear having its edge shaped to enter and seat in the lens socket of said frame properly to position and support the casing and lens grooves relatively thereto, and means to retain said arcuate supporting member in position in the lens socket.

2. A lens fitting attachment for fitted lensless frames comprising a casing providing an annular front rim and a plurality of parallel arcuate open lens-receiving grooves spaced rearwardly of said rim having resilient grooved lens-gripping members, said casing having further means at its rear end having its edge shaped to enter and seat in the lens groove of the frame properly to position and support said casing and grooves relatively to the lens grooves of said frames, and an annular axis-marker rotatably mounted on the rim at the front of said casing.

3. A lens fitting attachment for fitted lensless frames comprising a casing providing an annular front rim and an arcuate open lens-receiving groove spaced rearwardly of said front rim and provided with lens-gripping and retaining means, and a casing support at the rear of said lens groove arranged to engage the lens socket of a fitted frame without lenses, with means to hold said support in said socket properly to position and support the casing lens groove relatively to the rim lens groove.

4. A lens fitting attachment for fitted lensless frames comprising a casing providing a front rim, a plurality of parallel arcuate open lens-receiving grooves spaced rearwardly of said front rim and having lens-gripping and retaining means, said casing having further at its rear end an arcuate wall in parallel with said lens-receiving grooves having its edge shaped to enter and seat in the lens grooves of said fitted frames.

5. A lens fitting attachment for spectacle frames comprising a casing providing a front rim, a plurality of parallel arcuate open lens-receiving grooves spaced rearwardly of said front rim and having lens gripping and retaining means, said casing having further at its rear end an arcuate wall in parallel with said lens-receiving grooves and constructed and designed to enter and seat in the lens grooves of the rims of frames without lenses, and a yielding curved member forming a continuation of said arcuate wall and designed to seat in the lens groove of said frame rim, yieldingly to lock said casing supported in proper relation to said frames.

JOHN L. KING.